United States Patent
Ohno et al.

(10) Patent No.: US 7,368,189 B2
(45) Date of Patent: *May 6, 2008

(54) MAGNETIC RECORDING MEDIUM

(75) Inventors: Mikio Ohno, Kanagawa (JP); Tatsuo Ishikawa, Kanagawa (JP); Tomohiro Ichikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 524 days.

This patent is subject to a terminal disclaimer.

(21) Appl. No.: 11/042,064

(22) Filed: Jan. 26, 2005

(65) Prior Publication Data

US 2005/0170213 A1  Aug. 4, 2005

(30) Foreign Application Priority Data

Jan. 30, 2004  (JP) .................. P. 2004-024032

(51) Int. Cl.
G11B 5/66 (2006.01)
B32B 27/06 (2006.01)

(52) U.S. Cl. ............ 428/845.5; 428/838; 428/847.2; 428/480

(58) Field of Classification Search ......... 428/838, 428/839.6, 845, 845.5, 847, 847.2, 847.3, 428/847.4, 847.6, 847.7, 480; 521/48; 522/104
See application file for complete search history.

(56) References Cited

U.S. PATENT DOCUMENTS

2002/0164503 A1* 11/2002 Tani et al. ............ 428/847.3
2003/0124385 A1* 7/2003 Ishikawa et al. ......... 428/847
2004/0023066 A1* 2/2004 Watase et al. .......... 428/838

FOREIGN PATENT DOCUMENTS

| EP | 1142936 | * | 10/2001 |
| JP | 7-6351 A | | 1/1995 |
| JP | 8-45060 A | | 2/1996 |

OTHER PUBLICATIONS

JA 08-45060 English translation.*
JA 08-45060 English abstract.*
JA 07-006351 English translation.*
JA 07-006351 English abstract.*

* cited by examiner

Primary Examiner—Carol Chaney
Assistant Examiner—Louis Falasco
(74) Attorney, Agent, or Firm—Sughrue Mion, PLLC

(57) ABSTRACT

A magnetic recording medium comprising: a magnetic layer containing ferromagnetic powder and a binder; a nonmagnetic support; and a back coat layer, in this order, wherein the nonmagnetic support contains polyester having an intrinsic viscosity of from 0.40 to 0.60 dl/g and a number average molecular weight of from 12,000 to 24,000, a surface of the magnetic layer on a side not having the nonmagnetic support has a surface roughness Ra of from 1 to 5 nm, and a surface of the back coat layer on a side not having the nonmagnetic support has a surface roughness Ra of from 6 to 20 nm.

18 Claims, No Drawings

MAGNETIC RECORDING MEDIUM

FIELD OF THE INVENTION

The present invention relates to a magnetic recording medium excellent in electromagnetic characteristics and having high durability.

BACKGROUND OF THE INVENTION

In the field of magnetic recording, realization of digital recording little in the deterioration of records is progressing superseding conventional analog recording. In addition to higher image quality and sound quality, miniaturization and saving of space are also required of the recording and reproducing apparatus used for digital recording and the magnetic recording medium. In general, much signal recording is required in digital recording as compared with analog recording, so that further higher recording density is required of the magnetic recording medium for digital recording.

An MR head that works with MR (magneto-resistance) as the principle of operation have got to be used in recent years. Several times of reproduction output can be obtained with the MR head as compared with the induction type magnetic head. Further, noises generated from instruments, e.g., impedance noises, are greatly reduced, therefore, it becomes possible to realize good recording and reproduction by lowering the noises coming from magnetic recording media themselves, and high density recording characteristics can be drastically improved. For this purpose, further fining of ferromagnetic powder particles and smoothing of the magnetic layer surface are required of the magnetic recording media for suppressing the noises of the media themselves.

In addition, for achieving high density recording, further shortening of the wavelengths of recording signals and narrowing of the recording track are necessary, so that further fining of ferromagnetic powder particles, increasing of packing density and smoothing of the magnetic layer surface are also required from these points of view. Further, in a magnetic tape, thinning of a magnetic recording medium is also required for increasing the volume density.

A magnetic recording medium has generally a constitution comprising a nonmagnetic support having provided thereon a magnetic layer, or a nonmagnetic support having thereon a nonmagnetic layer and a magnetic layer on the nonmagnetic layer.

For the thinning of a magnetic recording medium with the increase of recording density, not only a magnetic layer but also a nonmagnetic support and a nonmagnetic layer are required to be thin. However, mere thinning is accompanied by the reduction of running durability due to thinning of a nonmagnetic support, the surface state of the nonmagnetic support greatly influences the magnetic layer due to thinning of the magnetic layer and the nonmagnetic layer, and the surface smoothness of the magnetic layer is disturbed, e.g., spines occur by reflecting the surface state of the nonmagnetic support, which results in the reduction of output, and the generation of dropout and noise. In particular, in a magnetic tape for use in a linear recording system, a tape runs almost in parallel to a head to touch the head, so that the dropout is liable to occur due to the spines on the surface of the magnetic layer.

On the other hand, for obtaining the smoothness of the surface of a magnetic layer, it is an effective means to smooth the surface of the side of the nonmagnetic support on which the magnetic layer is formed, and further fining of additives, such as fillers, to be added to the nonmagnetic support and further reduction of the addition amounts are effective for that purpose. However, the strength of the nonmagnetic support lowers by changing the filler size and addition amount, and durability, particularly the durability of the tape edge, is deteriorated.

Accordingly, in advancing the increment of recording density of a magnetic recording medium, the compatibility of the improvement of electromagnetic characteristics by surface smoothness and durability is desired.

A magnetic recording medium is so far proposed (refer to, e.g., JP-A-7-6351 (The term "JP-A" as used herein refers to an "unexamined published Japanese patent application".) and JP-A-8-45060) in which the strength of the nonmagnetic support is ensured by justifying the molecular weight and the viscosity of the polyethylene naphthalate used as the nonmagnetic support and the Young's modulus of the nonmagnetic support, and particularly the assurance of running durability is contrived by preventing the protuberance of the tape edge.

SUMMARY OF THE INVENTION

Although there is disclosed in JP-A-7-6351 and JP-A-8-45060 on the assurance of the strength of the nonmagnetic support as described above, there is no disclosure on the surface properties of the magnetic recording medium. In particular, in the case of a magnetic tape, inferior surface properties of a tape result in an inferior rolled up form, which causes the deterioration of running durability, so that not only the surface of a magnetic layer but also the surface of the side opposite to the magnetic layer is necessary to be made proper. Further, the prescriptions in each of JP-A-7-6351 and JP-A-8-45060 alone are not sufficient as the support of the latest magnetic recording medium improved in recording density.

For that reason, a magnetic recording medium having proper surface properties and excellent electromagnetic characteristics and durability is looked for as the latest magnetic recording medium improved in recording density.

In view of these circumstances, an object of the present invention is to provide a magnetic recording medium excellent in electromagnetic characteristics and durability, more specifically to provide a highly reliable magnetic recording medium having a high SNR, good in a rolling up property, and little in the damage of a tape edge even in repeating running.

The above object of the invention can be achieved by a magnetic recording medium having the following constitution.

(1) A magnetic recording medium comprising a nonmagnetic support having a magnetic layer containing ferromagnetic powder and a binder provided on one side of the support, and a back coat layer provided on the other side of the nonmagnetic support, wherein the nonmagnetic support is a polyester film having an intrinsic viscosity of from 0.40 to 0.60 dl/g and a number average molecular weight of from 12,000 to 24,000, the surface roughness (Ra) of the magnetic layer surface is from 1 to 5 nm, and the surface roughness (Ra) of the back coat layer surface is from 6 to 20 nm.

(2) The magnetic recording medium as described in the above item (1), wherein the nonmagnetic support is a laminated polyester film comprising two layers, the tracer system three dimensional surface roughness (SRa) of the nonmagnetic support surface on the side having the magnetic layer (side A) is from 1 to 6 nm, the tracer system three dimensional surface roughness (SRa) on the side having the back coat layer (side B) is from 6 to 10 nm, and SRa (A)<SRa (B).

(3) The magnetic recording medium as described in the above item (1) or (2), wherein a nonmagnetic layer containing nonmagnetic powder and a binder is provided between the nonmagnetic support and the magnetic layer.

According to the invention, a magnetic recording medium for high density recording excellent in electromagnetic characteristics and durability can be obtained by controlling the physical characteristics of a nonmagnetic support and the surface properties of a magnetic layer and a back coat layer. The magnetic recording medium according to the invention has, in particular in a recording and reproducing system using an MR head, a high SNR, is excellent in electromagnetic characteristics, has high tape edge strength, is excellent in running durability, and further, is excellent in a rolling up property as a tape.

DETAILED DESCRIPTION OF THE INVENTION

The magnetic recording medium in the invention comprises a nonmagnetic support having a magnetic layer on one side of the support, and a back coat layer on the other side, and has excellent electromagnetic characteristics and durability suitable for high density recording by justifying the physical characteristics, i.e., the intrinsic viscosity and the molecular weight of the polyester used as the nonmagnetic support, and the surface properties of the magnetic layer and the back coat layer.

The intrinsic viscosity of the polyester used as a film as the nonmagnetic support is from 0.40 to 0.60 dl/g and the number average molecular weight is from 12,000 to 24,000. When the intrinsic viscosity and the number average molecular weight are in these ranges, the film strength can be increased and the durability of the medium, in particular the durability of the film edge can be improved. When the intrinsic viscosity is less than 0.40 dl/g or the number average molecular weight is less than 12,000, the degree of polymerization is low, so that the strength does not increase and the film-forming property is also inferior. While when the intrinsic viscosity exceeds 0.60 dl/g or the number average molecular weight is higher than 24,000, the slitting property in a slitting process lowers. From this point of view, the intrinsic viscosity is more preferably from 0.45 to 0.55 dl/g, particularly preferably from 0.48 to 0.52 dl/g, and the number average molecular weight is more preferably from 14,000 to 18,000, and particularly preferably from 16,000 to 17,000.

In the invention, intrinsic viscosity means a value obtained by dissolving polyester in a mixed solvent comprising phenol/1,1,2,2-tetrachloroethane (60/40 by weight), measuring the relative viscosities of the solution corresponding to the concentration of the polyester at several points at 25° C. with an automatic viscometer mounting Ubbelohde's viscometer, plotting the obtained measured data and extrapolating the point of zero of concentration. The number average molecular weight means a number average molecular weight obtained by dissolving polyester in hexafluoroisopropanol and analyzing by GPC (gel permeation chromatography) calculated in terms of polymethyl methacrylate (PMMA).

In the invention, as the surface properties of a magnetic layer and a back coat layer, the surface roughness of each layer surface (Ra) is prescribed.

The surface roughness (Ra) of the surface of a magnetic layer is from 1 to 5 nm and the surface roughness (Ra) of the surface of a back coat layer is from 6 to 20 nm. When the surface roughness of each of a magnetic layer and a back coat layer is in this range, a high SNR, excellent electromagnetic characteristics and good running durability can be obtained conjointly with the improved strength of the nonmagnetic support. Further, when the magnetic recording medium is rolled up as a magnetic tape, the offset of the surface unevenness of the back coat layer to the magnetic layer (which causes the reduction of electromagnetic characteristics) can be prevented, and a rolling up property becomes good. From this point of view, the surface roughness (Ra) of the magnetic layer surface is more preferably from 2 to 5 nm. The surface roughness (Ra) of the back coat layer surface is more preferably from 8 to 15 nm, and particularly preferably from 9 to 13 nm.

The surface roughness (Ra) of a magnetic layer and a back coat layer can be brought to a prescribed range by controlling the surface properties of a nonmagnetic support (the later described SRa (A) and SRa (B)), adjusting various additives (e.g., in a back coat layer, adjusting the particle size and the addition amount of carbon black), and by calendering treatment.

The surface roughness (Ra) can be measured with an atomic force microscope (AFM) Nanoscope III (manufactured by Digital Instruments Corp.). In this case, the measurement is carried out with an SiN probe of a quadrangular pyramid having a sharpness of 70° and a radius of curvature of 100 mm or less to a measuring sample of a size of 15×15 μm by a contact mode, and Ver.3.25 software can be utilized.

The constitution and the like of each layer of the magnetic recording medium in the invention are described in detail below.

Nonmagnetic Support:

Polyesters for use in the invention as the nonmagnetic supports are preferably polyesters comprising dicarboxylic acid and diol, e.g., polyethylene naphthalate and polyethylene terephthalate.

As the dicarboxylic acid components of polyesters, terephthalic acid, isophthalic acid, phthalic acid, 2,6-naphthalenedicarboxylic acid, 2,7-naphthalenedicarboxylic acid, diphenyl sulfone dicarboxylic acid, diphenyl ether dicarboxylic acid, diphenylethanedicarboxylic acid, cyclohexanedicarboxylic acid, diphenyldicarboxylic acid, diphenyl thioether dicarboxylic acid, diphenyl ketone dicarboxylic acid, and phenylindanedicarboxylic acid can be exemplified.

As the diol components, ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl)sulfone, bisphenol fluorene dihydroxy ethyl ether, diethylene glycol, neopentyl glycol, hydroquinone, and cyclohexanediol can be exemplified.

Of polyesters comprising these dicarboxylic acids and diols as main constitutional components, from the points of transparency, mechanical strength and dimensional stability, polyesters mainly comprising terephthalic acid and/or 2,6-naphthalenedicarboxylic acid as the dicarboxylic acid components, and ethylene glycol and/or 1,4-cyclohexanedimethanol as the diol components are preferred. Of these polyesters, polyesters mainly comprising polyethylene terephthalate or polyethylene-2,6-naphthalate, polyesters copolymers comprising terephthalic acid, 2,6-naphthalenedicarboxylic acid and ethylene glycol, and polyesters mainly comprising mixtures of two or more of these polyesters are preferred. Polyesters mainly comprising polyethylene-2,6-naphthalate are particularly preferred.

Polyesters constituting the polyester films in the invention may be copolymerized with other copolymer components or mixed with other polyesters so long as they do not hinder the effect of the invention. As the examples thereof, the aforementioned dicarboxylic acid components, diol components, and polyesters comprising these components are exemplified.

For the purpose of being hard to cause delamination when formed as a film, polyesters for use in the invention may be copolymerized with aromatic dicarboxylic acids having a sulfonate group or ester formable derivatives of them, dicarboxylic acids having a polyoxyalkylene group or ester formable derivatives of them, or diols having a polyoxyalkylene group. Of these compounds, from the points of polymerization reactivity of polyesters and transparency of films, sodium 5-sulfoisophthalate, sodium 2-sulfoterephthalate, sodium 4-sulfophthalate, sodium 4-sulfo-2,6-naphthalenedicarboxylate, compounds obtained by substituting the sodium of the above compounds with other metals (e.g., potassium, lithium, etc.), ammonium salt or phosphonium salt, or ester formable derivatives of them, polyethylene glycol, polytetramethylene glycol, polyethylene glycol-polypropylene glycol copolymers, and compounds obtained by oxidizing both terminal hydroxyl groups of these compounds to make carboxyl groups are preferably used. The proportion of the copolymerization of these compounds for this purpose is preferably from 0.1 to 10 mol % on the basis of the amount of the dicarboxylic acids constituting the polyesters.

For improving heat resistance, bisphenol compounds, and compounds having a naphthalene ring or a cyclohexane ring can be copolymerized with polyesters. The proportion of the copolymerization of these compounds is preferably from 1 to 20 mol % on the basis of the amount of the dicarboxylic acids constituting the polyesters.

The synthesizing method of polyesters is not particularly restricted in the invention, and well-known manufacturing methods of polyesters can be used. For example, a direct esterification method of directly esterification reacting dicarboxylic acid component and diol component, and an ester exchange method of performing ester exchange reaction of dialkyl ester as the dicarboxylic acid component and diol component in the first place, which is then polymerized by heating under reduced pressure to remove the excessive diol component can be used. At this time, if necessary, an ester exchange catalyst, a polymerization reaction catalyst or a heat resistive stabilizer can be added.

Further, one or two or more kinds of various additives, such as a coloring inhibitor, an antioxidant, a crystal nucleus agent, a sliding agent, a stabilizer, a blocking preventive, an ultraviolet absorber, a viscosity controller, a defoaming and clarifying agent, an antistatic agent, a pH adjustor, a dye, a pigment and a reaction stopper may be added in each process of synthesis. The adjusting methods of the intrinsic viscosity and the number average molecular weight of polyesters are not particularly restricted in the invention, and these can be adjusted by controlling, e.g., the reaction time of the polymerization of a material monomer, the reaction temperature, reaction solvents, pressure, the concentration of a material monomer, and catalysts. Further, as other method, a reaction solution is taken out according to the progress of the reaction in synthesis to measure the viscosity, and the reaction may be stopped when desired viscosity is obtained. Furthermore, a method of investigating the correspondence of Mn and Mw to the torque applied to the stirrer of the polymerization tank in advance, and stopping the polymerization reaction when the prescribed torque is reached can be exemplified. In the case of a polycondensation reaction such as polyester, it is also possible to use a method of investigating in advance the correspondence of the number average molecular weight and the weight average molecular weight to the amount of water (in the case of direct polymerization) or alcohol (in the case of ester exchange reaction) discharged out of the reaction system at the time of polymerization, and stopping the polymerization reaction at the stage when the prescribed amount of water or alcohol is discharged. As another method, it is also preferred to advance polymerization once to reach the number average molecular weight exceeding the prescribed range, examining in advance the correspondence of the number average molecular weight to the melt viscosity, and controlling, at the time of film forming, the residence time of the polymer in extruder before melt and/or after melt so that the melt viscosity comes into the prescribed range. The above methods are described as examples and the present invention is not limited to these methods.

Polyester films in the invention have a Young's modulus in the machine direction of preferably from 7.0 to 8.6 GPa, in the transverse direction of from 5.4 to 8.0 GPa. If the Young's modulus in the machine direction of a polyester film exceeds 8.6 GPa, when the film is used as a magnetic tape for digital use, the sound of the rotating head of a digital video recorder striking the tape produces resonance, which is not preferred. While when the Young's modulus in the transverse direction is less than 5.4 GPa, the strength of the magnetic tape in the transverse direction is insufficient, so that the tape is liable to be folded by a guide pin for regulating tape pass in running, which is not preferred.

The polyester film in the invention preferably has the surface roughness (SRa) of the surface on the side having a magnetic layer (side A) measured with a tracer system three dimensional surface roughness meter of from 1 to 6 nm, more preferably from 2 to 5 nm. SRa (A) in this range is preferred to obtain a smooth magnetic layer (a magnetic layer having the above surface roughness Ra), and also preferred to maintain suitable running durability and obtain high output. The surface roughness (SRa) of the surface on the side having a back coat layer (side B), that is, the opposite side to side A, by the tracer system three dimensional surface roughness meter is preferably from 6 to 10 nm, more preferably from 7 to 10 nm. SRa (B) in this range is preferred to obtain a back coat layer having proper surface roughness (a back coat layer having the above surface roughness Ra), as a result, a good handling property can be obtained by suppressing the increase of the friction coefficient, and the offset of the roughness of the surface of side B to the surface of side A or the transfer of configuration to thereby roughen the magnetic layer surface can be prevented when the film is rolled round a reel.

In the invention, SRa (A) and SRa (B) mean the values obtained by the measurement with a tracer system three dimensional surface roughness meter according to JIS B 0601.

For forming side A in a polyester film, it is preferred for the polyester to contain fine particles having an average particle size of from 30 to 150 nm, preferably from 40 to 100 nm, in proportion of 0.1 weight % or less, preferably 0.06 weight % or less. From the point of the durability of a magnetic layer, it is preferred to contain the fine particles. As such fine particles, silica, calcium carbonate, alumina, polyacrylic particles and polystyrene particles can be preferably used.

It is preferred that side B of the polyester is rougher than side A, that is, SRa (A)<SRa (B), in view of the film forming process of a nonmagnetic support, the manufacturing process of a magnetic recording medium and the running stability of a tape.

The methods of making side B rougher than side A are not particularly limited, but a method of laminating at least two kinds of polyester films different in the kinds, the average particle sizes and/or the addition amounts of fine particles is preferred. As the method of laminating the layers of polyester films, a co-extrusion process is preferably used. At that time, the thickness of the layer of the polyester film forming side B is preferably from ½ to 1/10 of the thickness of the entire film. As the fine particles used in the layer of the polyester film forming side B, calcium carbonate, silica, alumina, polystyrene particles and silicone resin particles are exemplified. The average particle size of these fine particles is preferably from 80 to 800 nm, more preferably from 100 to 700 nm, and the addition amount is preferably from 0.05 to 1.0 weight %, more preferably from 0.08 to 0.8 weight %.

Polyester films for use in the invention can be manufactured according to conventionally well-known methods. In the case of a laminated polyester film, for example, the polyester for forming side A and the polyester for forming side B are laminated in a die by using a well-known extruder, the laminated polyester is extruded from a nozzle in the form of a sheet at temperature of from a melting point (Tm) to Tm+70° C., and then the extruded polyester is suddenly cooled and set at from 40 to 90° C., whereby a laminated unstretched film is obtained. After that, the unstretched film is stretched by an ordinary method in a uniaxial direction by 2.5 to 4.5 times, preferably from 2.8 to 3.9 times, at temperatures around (glass transition temperature (Tg)–10° C.) to (Tg+70° C.), and then in the right angle direction to the former direction by 4.5 to 8.0 times, preferably from 4.5 to 6.0 times, at temperatures around Tg to (Tg+70° C.), and further if necessary, again in the machine direction and/or transverse direction, whereby a biaxially oriented film is obtained. That is, it is preferred to perform stretching of two stages, three stages, four stages, or multi-stages. The total stretch magnification is generally 12 times or more in terms of area stretch magnification, preferably from 12 to 32 times, more preferably from 14 to 26 times. The biaxially oriented film is given excellent dimensional stability by subsequent heat fixation crystallization at temperature of from (Tg+70° C.) to (Tm–10° C.), e.g., from 180 to 250° C. The time of heat fixation is preferably from 1 to 60 seconds. It is preferred to adjust a heat shrinkage factor in the heat fixation treatment by relaxing the film by 3.0% or less, preferably from 0.5 to 2.0%, in the machine direction and/or transverse direction.

Magnetic Layer

Ferromagnetic Powder:

As the ferromagnetic powders for use in a magnetic layer of the magnetic recording medium of the invention, ferromagnetic metal powders or hexagonal ferrite powders are exemplified.

Ferromagnetic Metal Powder:

Ferromagnetic alloy powders comprising α-Fe as a main component are preferably used as ferromagnetic metal powders. These ferromagnetic powders may contain, in addition to the prescribed atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. Ferromagnetic metal powders containing at least one of Al, Si, Ca, Y, Ba, La, Nd, Co, Ni and B in addition to α-Fe are preferred, and those containing Co, Al or Y are particularly preferred. Further in detail, ferromagnetic metal powders containing from 10 to 40 atomic % of Co, from 2 to 20 atomic % of Al, and from 1 to 15 atomic % of Y, respectively based on Fe, are preferred.

These ferromagnetic metal powders may be treated with the later-described dispersants, lubricants, surfactants and antistatic agents in advance before dispersion. A small amount of water, hydroxide or oxide may be contained in ferromagnetic metal powders. Ferromagnetic metal powders preferably have a moisture content of from 0.01 to 2%. It is preferred to optimize the moisture content of ferromagnetic metal powders by selecting the kinds of binders. The pH of ferromagnetic metal powders is preferably optimized by the combination with the binder to be used. The pH range is generally from 6 to 12, preferably from 7 to 11. Ferromagnetic powders sometimes contain soluble inorganic ions of, e.g., Na, Ca, Fe, Ni, Sr, $NH_4$, $SO_4$, Cl, $NO_2$ and $NO_3$. It is preferred that inorganic ions are substantially not contained, but the properties of ferromagnetic powders are not particularly affected if the total content of each ion is about 300 ppm or less. Ferromagnetic powders for use in the invention preferably have less voids and the value of the voids is preferably 20% by volume or less, and more preferably 5% by volume or less.

The crystallite size of ferromagnetic metal powders is preferably from 8 to 20 nm, more preferably from 10 to 18 nm, and still more preferably from 12 to 16 nm. The crystallite size is the average value obtained from the half value width of diffraction peak with an X-ray diffractometer (RINT 2000 series, manufactured by Rigaku Denki Co.) on the conditions of radiation source CuKα1, tube voltage 50 kV and tube current 300 mA by Scherrer method.

Ferromagnetic metal powders have a specific surface area ($S_{BET}$) measured by a BET method of preferably 40 $m^2$/g or more and less than 70 $m^2$/g, more preferably from 40 to 60 $m^2$/g. When the specific surface area of ferromagnetic metal powders is in this range, good surface properties are compatible with low noise. The pH of ferromagnetic metal powders is preferably optimized by the combination with the binder to be used. The pH range is preferably from 4 to 12, more preferably from 7 to 10. Ferromagnetic metal powders may be subjected to surface treatment with Al, Si, P or oxides of them, if necessary, and the amount of the surface-treating compound is from 0.1 to 10% based on the amount of the ferromagnetic metal powders. By the surface treatment, the adsorption amount of lubricant, e.g., fatty acid, preferably becomes 100 mg/$m^2$ or less.

The shape of ferromagnetic metal powders is not especially restricted, and any shape such as an acicular, granular, ellipsoidal or tabular shape may be used, but it is preferred to use acicular ferromagnetic powders. When acicular ferromagnetic metal powders are used, the long axis length is preferably from 30 to 60 nm, more preferably from 30 to 50 nm. The acicular ratio is preferably from 4 to 12, more preferably from 5 to 12. The coercive force (Hc) of ferromagnetic metal powders is preferably from 159.2 to 238.8 kA/m (from 2,000 to 3,000 Oe), more preferably from 167.2 to 230.8 kA/m (from 2,100 to 2,900 Oe). The saturation magnetic flux density of ferromagnetic metal powders is preferably from 150 to 300 T·m (1,500 to 3,000 G), more preferably from 160 to 290 T·m (1,600 to 2,900 G).

The saturation magnetization (σs) is preferably from 140 to 170 A·$m^2$/kg (140 to 170 emu/g), more preferably from 145 to 160 A·$m^2$/kg (145 to 160 mu/g). SFD (Switching Field Distribution) of magnetic powders themselves is preferably small, preferably 0.8 or less. When SFD is 0.8 or less, electromagnetic characteristics are excellent, high output can be obtained, magnetic flux revolution becomes sharp and peak shift becomes small, therefore, suitable for high density digital magnetic recording. To achieve small Hc distribution, making particle size distribution of goethite in ferromagnetic metal powders good, using monodispersed $\alpha$-$Fe_2O_3$, and preventing sintering among particles are effective methods.

Ferromagnetic metal powders manufactured by well-known methods can be used in the invention, and such methods include a method of reducing a water-containing iron oxide having been subjected to sintering preventing treatment, or an iron oxide with reducing gas, e.g., hydrogen, to thereby obtain Fe or Fe—Co particles; a method of reducing a composite organic acid salt (mainly an oxalate) with reducing gas, e.g., hydrogen; a method of thermally decomposing a metal carbonyl compound; a method of reduction by adding a reducing agent, e.g., sodium boron hydride, hypophosphite or hydrazine, to an aqueous solution of a ferromagnetic metal; and a method of evaporating a metal in low pressure inert gas to thereby obtain fine powder. The thus-obtained ferromagnetic metal powders are subjected to well-known gradual oxidation treatment. As such treatment, a method of forming an oxide film on the surfaces of ferromagnetic metal powders by reducing a water-containing iron oxide or an iron oxide with reducing gas, e.g., hydrogen, and regulating partial pressure of oxygen-containing gas and inert gas, the temperature and the time is little in demagnetization and preferred.

Ferromagnetic Hexagonal Ferrite Powder:

The examples of ferromagnetic hexagonal ferrite powders include substitution products of barium ferrite, strontium ferrite, lead ferrite and calcium ferrite, and Co substitution products of these ferrites. Specifically, magnetoplumbite type barium ferrite and strontium ferrite, magnetoplumbite type ferrites having covered the particle surfaces with spinel, and magnetoplumbite type barium ferrite and strontium ferrite partially containing spinel phase can be exemplified. Ferromagnetic hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, ferromagnetic hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and manufacturing methods, specific impurities may be contained.

The particle size of ferromagnetic hexagonal ferrite powder is preferably from 5 to 40 nm as the average tabular size, more preferably from 10 to 38 nm, and particularly preferably from 15 to 36 nm. The tabular size used here means the longest hexagonal diameter of the base of the hexagonal pole of hexagonal ferrite powder, and the average tabular size is the arithmetic mean of it. When reproduction is performed using a magneto-resistance head in particular for increasing track density, it is particularly necessary to reduce noise, accordingly the tabular size is preferably 36 nm or less. However, when the tabular size is in the range of from 5 to 40 nm, stable magnetization free from the influence of thermal fluctuation can be expected and, at the same time, noise can be suppressed, so that the hexagonal ferrite powder is suitable for high density magnetic recording. The average tabular thickness is preferably from 1 to 30 nm, more preferably from 2 to 25 nm, and particularly preferably from 3 to 20 nm. The tabular ratio (tabular diameter/tabular thickness) is preferably from 1 to 15, more preferably from 1 to 7. When the tabular ratio is in the range of from 1 to 15, sufficient orientation can be attained while maintaining high packing density in a magnetic layer and, at the same time, the increase of noise due to stacking among particles can be prevented. The specific surface area ($S_{BET}$) measured by a BET method of particles in the above particle size range is from 10 to 200 m²/g. The specific surface area nearly coincides with the calculated value from the tabular diameter and the tabular thickness of a particle.

The distribution of tabular diameter·tabular thickness of ferromagnetic hexagonal ferrite powder particles is generally preferably as narrow as possible. It is difficult to show the distribution of tabular diameter·tabular thickness of particles in numerical values but the distributions can be compared by measuring 500 particles selected randomly from TEM photographs of particles. The distributions of tabular diameter·tabular thickness of particles are in many cases not regular distributions, but when expressed in the standard deviation to the average size by calculation, σ/average size is from 0.1 to 2.0.

For obtaining narrow particle size distribution, it is efficient to make a particle-forming reaction system homogeneous as far as possible, and to subject particles formed to distribution improving treatment as well. For instance, a method of selectively dissolving superfine particles in an acid solution is also known.

The coercive force (Hc) of hexagonal ferrite particles can be made from 159.2 to 238.8 kA/m (from 2,000 to 3,000 Oe), but Hc is preferably from 175.1 to 222.9 kA/m (from 2,200 to 2,800 Oe), and more preferably from 183.1 to 214.9 kA/m (from 2,300 to 2,700 Oe). However, when the saturation magnetization ($\sigma_s$) of the head exceeds 1.4 T, it is preferred that Hc is 159.2 kA/m or less. Coercive force (Hc) can be controlled by the particle size (tabular diameter·tabular thickness), the kinds and amounts of the elements contained in the hexagonal ferrite powder, the substitution sites of the elements, and the particle forming reaction conditions.

The saturation magnetization ($\sigma_s$) of hexagonal ferrite particles is preferably from 40 to 80 A·m²/kg (emu/g). Saturation magnetization ($\sigma_s$) is preferably higher, but it has the inclination of becoming smaller as particles become finer. For improving saturation magnetization ($\sigma_s$), compounding spinel ferrite to magnetoplumbite ferrite, and the selection of the kinds and the addition amount of elements to be contained are well known. It is also possible to use W-type hexagonal ferrite. In dispersing magnetic powders, the particle surfaces of magnetic particles may be treated with dispersion media and substances compatible with the polymers. Inorganic and organic compounds are used as surface-treating agents. For example, oxides or hydroxides of Si, Al and P, various kinds of silane coupling agents and various kinds of titanium coupling agents are primarily used as such compounds. The addition amount of these surface-treating agents is from 0.1 to 10 weight % based on the weight of the magnetic powder. The pH of magnetic powders is also important for dispersion, and the pH is generally from 4 to 12 or so. The optimal value of the pH is dependent upon the dispersion media and the polymers. Taking the chemical stability and storage stability of the medium into consideration, pH of from 6 to 11 or so is selected. The moisture content in magnetic powders also affects dispersion. The optimal value of the moisture content is dependent upon the dispersion media and the polymers, and the moisture content of from 0.01 to 2.0% is selected in general.

The manufacturing methods of ferromagnetic hexagonal ferrites include the following methods and any of these methods can be used in the invention with no restriction: (1) a glass crystallization method comprising the steps of mixing metallic oxide which substitutes barium oxide, iron oxide, iron with boron oxide as a glass-forming material so as to make a desired ferrite composition, melting and then quenching the ferrite composition to obtain an amorphous product, treating by reheating, washing and pulverizing the amorphous product, to thereby obtain barium ferrite crystal powder; (2) a hydrothermal reaction method comprising the steps of neutralizing a solution of barium ferrite composition metallic salt with an alkali, removing the byproducts produced, heating the liquid phase at 100° C. or more, washing, drying and then pulverizing, to thereby obtain barium ferrite crystal powder; and (3) a coprecipitation method comprising the steps of neutralizing a solution of barium ferrite composition metallic salt with an alkali, removing the byproducts produced and drying, treating the system at 1,100° C. or less, and then pulverizing to obtain barium ferrite crystal powder. Ferromagnetic hexagonal ferrite powders may be subjected to surface treatment with Al, Si, P or oxides of them, if necessary, and the amount of the surface-treating compound is from 0.1 to 10% based on the amount of the hexagonal ferrite powders. By the surface treatment, the adsorption amount of lubricant, e.g., fatty acid, preferably becomes 10 mg/m$^2$ or less. Hexagonal ferrite powders sometimes contain soluble inorganic ions of, e.g., Na, Ca, Fe, Ni and Sr, but it is preferred that these inorganic ions are not substantially contained, but the properties of hexagonal ferrite powders are not particularly affected if the amount is 200 ppm or less.

Binder:

Conventionally well-known thermoplastic resins, thermosetting resins, reactive resins and the mixtures of these resins are used as the binder in a magnetic layer in the invention. The examples of thermoplastic resins include polymers or copolymers containing, as the constituting unit, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal and vinyl ether; polyurethane resins and various rubber resins.

The examples of thermosetting resins and reactive resins include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Thermoplastic resins, thermosetting resins and reactive resins are described in detail in *Plastic Handbook*, Asakura Shoten.

When an electron beam-curable resin is used in a magnetic layer, not only film strength and durability are improved but also surface smoothness and electromagnetic characteristics are further improved. The examples of these resins and manufacturing methods are disclosed in JP-A-62-256219 in detail.

The above resins can be used alone or in combination. It is particularly preferred to use polyurethane resins. It is more preferred to use hydrogenated bisphenol A; polyurethane resins obtained by reacting a compound having a cyclic structure such as polypropylene oxide adduct of hydrogenated bisphenol A, polyol having an alkylene oxide chain and a molecular weight of from 500 to 5,000, polyol having a cyclic structure and a molecular weight of from 200 to 500 as the chain extender, and organic diisocyanate, and introducing a polar group thereto; polyurethane resins obtained by reacting aliphatic dibasic acid such as succinic acid, adipic acid or sebacic acid, polyester polyol comprising aliphatic diol having a branched alkyl side chain and not having a cyclic structure such as 2,2-dimethyl-1,3-propanediol, 2-ethyl-2-butyl-1,3-propanediol, or 2,2-diethyl-1,3-propanediol, aliphatic diol having a branched alkyl side chain and having 3 or more carbon atoms such as 2-ethyl-2-butyl-1,3-propanediol or 2,2-diethyl-1,3-propanediol as the chain extender, and an organic diisocyanate compound, and introducing a polar group thereto; or polyurethane resins obtained by reacting a compound having a cyclic structure such as dimer diol, a polyol compound having a long alkyl chain, and organic diisocyanate, and introducing a polar group thereto.

The average molecular weight of polar group-containing polyurethane resins usable in the invention is preferably from 5,000 to 100,000, more preferably from 10,000 to 50,000. When the average molecular weight is 5,000 or more, the obtained magnetic layer is not accompanied by the reduction of physical strength, such as the brittleness of the layer, and the durability of the magnetic recording medium is not influenced. While when the average molecular weight is 100,000 or less, the solubility in a solvent does not decrease, so that good dispersibility can be obtained, in addition, the coating viscosity in the prescribed concentration does not increase, so that good working properties can be obtained and handling becomes easy.

As the polar groups contained in the above polyurethane resins, —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N$^+$R$_3$ (wherein R represents a hydrocarbon group) an epoxy group, —SH and —CN are exemplified. Polyurethane resins to which one or more of these polar groups are introduced by copolymerization or addition reaction can be used. When these polar group-containing polyurethane resins have an OH group, to have a branched OH group is preferred from the aspects of curability and durability, to have from 2 to 40 branched OH groups per a molecule is preferred, and to have from 3 to 20 groups is more preferred. The amount of these polar groups is from $10^{-1}$ to $10^{-8}$ mol/g, preferably from $10^{-2}$ to $10^{-6}$ mol/g.

The specific examples of binders include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Ink and Chemicals Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichiseika Color & Chemicals Mfg. Co., Ltd), MX5004 (manufactured by Mitsubishi Kasei Corp.), Sanprene SP-150 (manufactured by Sanyo Chemical Industries, Ltd.), Saran F310 and F210 (manufactured by Asahi Kasei Corporation).

The addition amount of binders for use in a magnetic layer of the invention is from 5 to 50 weight %, preferably from 10 to 30 weight %, based on the weight of the ferromagnetic powder (ferromagnetic metal powder or ferromagnetic hexagonal ferrite powder). When polyurethane resins are used, the amount is from 2 to 20 weight %, when polyisocyanate is used, the amount is from 2 to 20 weight %, and it is preferred to use them in combination, however, for instance, when corrosion of the head is caused by a slight amount of chlorine due to dechlorination, it is possible to use polyurethane alone or a combination of polyurethane and isocyanatealone. When a vinyl chloride resin is used as other resin, the addition amount is preferably from 5 to 30 weight %. When polyurethane is used in the invention, the polyurethane has a glass transition temperature of preferably from −50 to 150° C., more preferably from 0 to 100° C., breaking extension of preferably from 100 to 2,000%, breaking stress of preferably from 0.49 to 98 MPa (from 0.05 to 10 kg/mm$^2$), and a yielding point of preferably from 0.49 to 98 MPa (from 0.05 to 10 kg/mm$^2$).

The examples of polyisocyanates usable in the invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyalcohols; and polyisocyanates formed by condensation reaction of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These compounds may be used alone, or in combination of two or more in each layer taking advantage of the difference in curing reactivity.

The above binders can be used in the layers other than a magnetic layer, e.g., a nonmagnetic layer and a back coat layer. When a magnetic layer comprises two or more layers, binders can be used in each layer. In that case, the amount of the binder, the amounts of vinyl chloride resins, polyurethane resins, polyisocyanate or other resins contained in the binder, the molecular weight and the amount of polar groups of each resin constituting the magnetic layer, or the physical properties of the above described resins can of course be varied in the nonmagnetic layer, the back coat layer and each magnetic layer, according to necessity. These factors should be rather optimized in respective layers. Well-known prior arts with respect to multilayer magnetic layers can be used in the invention. For example, when the amount of a binder is varied in each layer, it is effective to increase the amount of a binder contained in a magnetic layer to reduce scratches on the surface of the magnetic layer. For improving the head touch against a head, it is effective to increase the amount of a binder in a nonmagnetic layer to impart flexibility.

Additives:

If necessary, additives can be added to a magnetic layer in the invention. As the additives, an abrasive, a lubricant, a dispersant, an auxiliary dispersant, an antifungal agent, an antistatic agent, an antioxidant, a solvent and carbon black can be exemplified. The examples of additives usable in the invention include molybdenum disulfide, tungsten disulfide, graphite, boron nitride, graphite fluoride, silicone oil, silicone having a polar group, fatty acid-modified silicone, fluorine-containing silicone, fluorine-containing alcohol, fluorine-containing ester, polyolefin, polyglycol, polyphenyl ether, aromatic ring-containing organic phosphonic acid, e.g., phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, and alkali metal salt of these organic phosphonic acids, alkylphosphonic acid, e.g., octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, and alkali metal salt of these alkylphosphonic acids, aromatic phosphoric ester, e.g., phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate, nonylphenyl phosphate, and alkali metal salt of these aromatic phosphoric esters, alkylphosphoric ester, e.g., octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, isoeicosyl phosphate, and alkali metal salt of these alkylphosphoric esters, alkylsulfonic esters and alkali metal salt of alkylsulfonic esters, fluorine-containing alkyl-sulfuric esters and alkali metal salt of alkylsulfuric esters, monobasic fatty acid having from 10 to 24 carbon atoms (which may contain an unsaturated bond or may be branched), e.g., lauric acid, myristic acid, palmitic acid, stearic acid, behenic acid, butyl stearate, oleic acid, linoleic acid, linolenic acid, elaidic acid, erucic acid, and alkali metal salt of these monobasic fatty acids, fatty acid monoester, fatty acid diester or polyhydric fatty acid ester composed of monobasic fatty acid having from 10 to 24 carbon atoms (which may contain an unsaturated bond or may be branched), e.g., butyl stearate, octyl stearate, amyl stearate, isooctyl stearate, octyl myristate, butyl laurate, butoxyethyl stearate, anhydrosorbitan monostearate, anhydrosorbitan tristearate, and any one of mono-, di-, tri-, tetra-, penta- or hexa-alcohols having from 2 to 22 carbon atoms (which may contain an unsaturated bond or may be branched), alkoxy alcohol having from 2 to 22 carbon atoms (which may contain an unsaturated bond or may be branched) and monoalkyl ether of alkylene oxide polymerized product, fatty acid amide having from 2 to 22 carbon atoms, and aliphatic amines having from 8 to 22 carbon atoms. Besides the above hydrocarbon groups, those having a nitro group, or an alkyl, aryl, or aralkyl group substituted with a group other than a hydrocarbon group, such as halogen-containing hydrocarbon, e.g., F, Cl, Br, $CF_3$, $CCl_3$, $CBr_3$, may be used.

In addition, nonionic surfactants, e.g., alkylene oxide, glycerol, glycidol, alkylphenol ethylene oxide adduct, etc., cationic surfactants, e.g., cyclic amine, ester amide, quaternary ammonium salts, hydantoin derivatives, heterocyclic rings, phosphoniums and sulfoniums, anionic surfactants containing an acid group, e.g., carboxylic acid, sulfonic acid or a sulfuric ester group, and amphoteric surfactants, e.g., amino acids, aminosulfonic acids, sulfuric or phosphoric esters of amino alcohol, and alkylbetaine can also be used. The details of these surfactants are described in detail in *Kaimen Kasseizai Binran* (*Handbook of Surfactants*), Sangyo Tosho Publishing Co., Ltd.

These lubricants and antistatic agents need not be 100% pure and may contain impurities such as isomers, unreacted products, byproducts, decomposed products and oxides, in addition to the main components. However, the content of such impurities is preferably 30 weight % or less, and more preferably 10 weight % or less.

As the specific examples of these additives, e.g., NAA-102, castor oil hardened fatty acid, NAA-42, cation SA, NaimeenL-201, Nonion E-208, Anon BF and Anon LG (manufactured by Nippon Oils and Fats Co., Ltd.), FAL-205 and FAL-123 (manufactured by Takemoto Oil & Fat), Enujerubu OL (manufactured by New Japan Chemical Co., Ltd.), TA-3 (manufactured by Shin-Etsu Chemical Co., Ltd.), Armide P (manufactured by LION AKZO CO., LTD.), Duomeen TDO (manufactured by Lion Corporation), BA-41G (manufactured by The Nisshin OilliO Group, Ltd.), Profan 2012E, Newpole PE61, Ionet MS-400 (manufactured by Sanyo Chemical Industries Ltd.) are exemplified.

Carbon blacks usable in a magnetic layer include furnace blacks for rubbers, thermal blacks for rubbers, carbon blacks for coloring, and acetylene blacks. Carbon blacks for use in the invention preferably have a specific surface area of from 5 to 500 m$^2$/g, a DBP oil absorption amount of from 10 to 400 ml/100 g, a particle size of from 5 to 300 nm, a pH value of from 2 to 10, a moisture content of from 0.1 to 10%, and a tap density of from 0.1 to 1 g/ml.

The specific examples of carbon blacks for use in the invention include BLACKPEARLS 2000, 1300, 1000, 900, 905, 800, 700, and VULCAN XC-72 (manufactured by Cabot Co., Ltd.), #80, #60, #55, #50 and #35 (manufactured by ASAHI CARBON CO., LTD.), #2400B, #2300, #900, #1000, #30, #40 and #10B (manufactured by Mitsubishi Kasei Corp.), CONDUCTEX SC, RAVEN 150, 50, 40, 15, and RAVEN-MT-P (manufactured by Columbia Carbon Co., Ltd.), and Ketjen Black EC (manufactured by Nippon EC Co., Ltd.). Carbon blacks may be surface-treated with a dispersant, may be grafted with resins, or a part of the surface may be graphitized in advance before use. Carbon blacks may be previously dispersed in a binder before being added to a magnetic coating solution. Carbon blacks can be used alone or in combination. It is preferred to use carbon blacks in an amount of from 0.1 to 30 weight % based on the weight of the magnetic powder. Carbon blacks can serve various functions such as the prevention of the static charge and the reduction of the friction coefficient of a magnetic layer, the impartation of a light-shielding property to a magnetic layer, and the improvement of the film strength of a magnetic layer. Such functions vary by the kind of the carbon black to be used. Accordingly, it is of course possible in the invention to select and determine the kinds, amounts and combinations of carbon blacks to be added to a magnetic layer and a nonmagnetic layer, on the basis of the above-described various properties such as the particle size, the oil absorption amount, the electrical conductance and the pH value, or these should be rather optimized in each layer. With respect to carbon blacks usable in a magnetic layer in the invention, *Carbon Black Binran* (*Handbook of Carbon Blacks*) (edited by Carbon Black Association) can be referred to.

Well-known organic solvents can be used in the invention. Organic solvents are used in an optional rate in the invention. The examples of organic solvents include ketones, e.g., acetone, methyl ethyl ketone, methyl isobutyl ketone, diisobutyl ketone, cyclohexanone, isophorone and tetrahydrofuran; alcohols, e.g., methanol, ethanol, propanol, butanol, isobutyl alcohol, isopropyl alcohol and methylcyclohexanol; esters, e.g., methyl acetate, butyl acetate, isobutyl acetate, isopropyl acetate, ethyl lactate and glycol acetate; glycol ethers, e.g., glycol dimethyl ether, glycol monoethyl ether and dioxane; aromatic hydrocarbons, e.g., benzene, toluene, xylene, cresol and chlorobenzene; chlorinated hydrocarbons, e.g., methylene chloride, ethylene chloride, carbon tetrachloride, chloroform, ethylene chlorohydrin and dichlorobenzene; and N,N-dimethylformamide and hexane.

These organic solvents need not be 100% pure and they may contain impurities such as isomers, unreacted products, byproducts, decomposed products, oxides and water in addition to their main components. However, the content of such impurities is preferably 30% or less, and more preferably 10% or less. It is preferred that the same kind of organic solvents are used in a magnetic layer and a nonmagnetic layer, but the addition amounts may differ. It is preferred to use organic solvents having high surface tension (such as cyclohexanone, dioxane and the like) in a nonmagnetic layer to increase coating stability. Specifically, it is important for the arithmetic mean value of the surface tension of the composition of the solvents in an upper layer is not lower than the arithmetic mean value of the surface tension of the composition of the solvents in a nonmagnetic layer. For improving dispersibility, the porality is preferably strong in a certain degree, and it is preferred that solvents having a dielectric constant of 15 or more account for 50% or more of the composition of the solvents. The dissolution parameter of solvents is preferably from 8 to 11.

The kinds and the amounts of these dispersants, lubricants and surfactants for use in the invention can be used differently in a magnetic layer and a nonmagnetic layer described later, according to necessity. For example, although these are not limited to the examples described here, dispersants have a property of adsorbing or bonding by the polar groups, and they are adsorbed or bonded by the polar groups mainly to the surfaces of ferromagnetic metal powder particles in a magnetic layer and mainly to the surfaces of nonmagnetic powder particles in a nonmagnetic layer, and it is supposed that an organic phosphorus compound once adsorbed is hardly desorbed from the surface of metal or metallic compound. Accordingly, the surfaces of ferromagnetic metal powder particles or nonmagnetic powder particles are in the state covered with alkyl groups or aromatic groups, so that the affinity of the ferromagnetic metal powder or nonmagnetic powder to the binder resin is improved, and further the dispersion stability of the ferromagnetic metal powder or nonmagnetic powder is also improved. Further, since lubricants are present in a free state, it is effective to use fatty acids each having a different melting point in a nonmagnetic layer and a magnetic layer so as to prevent bleeding out of the fatty acids to the surface, or esters each having a different boiling point and a different polarity so as to prevent bleeding out of the esters to the surface. Also, the amount of surfactants is controlled so as to improve the coating stability, or the amount of lubricants in a nonmagnetic layer is made larger so as to improve the lubricating effect. All or a part of the additives to be used in the invention may be added to a magnetic coating solution or a nonmagnetic coating solution in any step of preparation. For example, additives may be blended with ferromagnetic powder before a kneading step, may be added in a step of kneading ferromagnetic powder, a binder and a solvent, may be added in a dispersing step, may be added after a dispersing step, or may be added just before coating.

Nonmagnetic Layer

The magnetic recording medium in the invention may have a nonmagnetic layer between a magnetic layer and a nonmagnetic support.

It is preferred to provide a nonmagnetic layer for thinning the thickness of the magnetic layer suitable for high density recording. The nonmagnetic layer is described in detail below.

The nonmagnetic layer in the invention exhibits its effect so long as it is substantially nonmagnetic, and even if, or intentionally, a small amount of magnetic powder is contained as the impurity, it reveals the effect of the invention, and as a matter of course the nonmagnetic layer can be regarded as essentially the same constitution as in the invention.

The term "substantially nonmagnetic" means that the residual magnetic flux density of the nonmagnetic layer is 10 T·m or less or the coercive force (Hc) is 8 kA/m (100 Oe) or less, preferably the residual magnetic flux density and the coercive force are zero. When the nonmagnetic layer contains magnetic powder, the content of the magnetic powder is preferably less than ½ of the entire inorganic powders in the nonmagnetic layer.

A soft magnetic layer comprising soft magnetic powder and a binder may be formed as the lower layer in place of the nonmagnetic layer. The thickness of the soft magnetic layer is the same as the case of the nonmagnetic layer.

The nonmagnetic layer in the invention preferably comprises nonmagnetic inorganic powder and a binder as the main components.

The nonmagnetic inorganic powders for use in the nonmagnetic layer can be selected from inorganic compounds, e.g., metallic oxide, metallic carbonate, metallic sulfate, metallic nitride, metallic carbide and metallic sulfide. Specifically, titanium oxide, e.g., titanium dioxide, cerium oxide, tin oxide, tungsten oxide, ZnO, $ZrO_2$, $SiO_2$, $Cr_2O_3$, α-alumina having an α-conversion rate of from 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide can be used alone or in combination of two or more. α-Iron oxide and titanium oxide are preferred.

The shape of nonmagnetic powders may be any of an acicular, spherical, polyhedral and tabular shapes. The crystallitesize of nonmagnetic powders is preferably from 4 nm to 1 μm, and more preferably from 40 to 100 nm. When the crystallite size of nonmagnetic powders is in the range of from 4 nm to 1 μm, dispersion can be performed easily, and preferred surface roughness can be obtained. The average particle size of nonmagnetic powders is preferably from 5 nm to 2 μm, but if necessary, a plurality of nonmagnetic powders each having a different average particle size may be combined, or a single nonmagnetic inorganic powder may have broad particle size distribution so as to attain the same effect as such a combination. Nonmagnetic powders particularly preferably have an average particle size of from 10 to 200 nm. When the average particle size is in the range of from 5 nm to 2 μm, preferred dispersibility and preferred surface roughness can be obtained.

Nonmagnetic powders have a specific surface area of from 1 to 100 $m^2/g$, preferably from 5 to 70 $m^2/g$, and more preferably from 10 to 65 $m^2/g$. When the specific surface area is in the range of from 1 to 100 $m^2/g$, preferred surface roughness can be secured and dispersion can be effected with a desired amount of binder. Nonmagnetic powders have an oil absorption amount using DBP (dibutyl phthalate) of generally from 5 to 100 ml/100 g, preferably from 10 to 80 ml/100 g, and more preferably from 20 to 60 ml/100 g; a specific gravity of generally from 1 to 12, and preferably from 3 to 6; a tap density of generally from 0.05 to 2 g/ml, preferably from 0.2 to 1.5 g/ml, when the tap density is in the range of from 0.05 to 2 g/ml, particles hardly scatter, handling is easy, and the powders tend not to adhere to the apparatus; pH of preferably from 2 to 11, particularly preferably between 6 and 9, when the pH is in the range of from 2 to 11, the friction coefficient does not increase under high temperature and high humidity or due to liberation of fatty acid; and a moisture content of generally from 0.1 to 5 weight %, preferably from 0.2 to 3 weight %, and more preferably from 0.3 to 1.5 weight %, when the moisture content is in the range of from 0.1 to 5 weight %, good dispersion is ensured and coating viscosity after dispersion stabilizes. The ignition loss of nonmagnetic powders is preferably 20 weight % or less, and inorganic powders showing small ignition loss are preferred.

When nonmagnetic powders are inorganic powder, Mohs' hardness is preferably from 4 to 10. When Mohs' hardness is in the range of from 4 to 10, durability can be secured. Nonmagnetic powders have a stearic acid adsorption amount of preferably from 1 to 20 $mmol/m^2$, more preferably from 2 to 15 $\mu mol/m^2$, heat of wetting to water at 25° C. of preferably from 200 to 600 $erg/cm^2$ (from 200 to 600 $mJ/m^2$). Solvents in this range of heat of wetting can be used. The number of the molecules of water on the surface of a nonmagnetic powder particle at 100 to 400° C. is preferably from 1 to 10/100 Å. The pH of isoelectric point in water is preferably from 3 to 9. The surfaces of nonmagnetic powders are preferably covered with $Al_2O_3$, $SiO_2$, $TiO_2$, $ZrO_2$, $SnO_2$, $Sb_2O_3$ or ZnO. $Al_2O_3$, $SiO_2$, $TiO_2$ and $ZrO_2$ are particularly preferred in dispersibility, and $Al_2O_3$, $SiO_2$ and $ZrO_2$ are still more preferred. They can be used in combination or can be used alone. According to purposes, a layer subjected to surface treatment by coprecipitation may be used. Alternatively, surfaces of particles may be covered with alumina previously, and then the alumina-covered surface may be covered with silica, or vice versa, according to purposes. A surface-covered layer may be a porous layer, if necessary, but a homogeneous and dense surface is generally preferred.

The specific examples of nonmagnetic powders for use in the a nonmagnetic layer according to the invention include Nanotite (manufactured by Showa Denko K.K.), HIT-100 and ZA-G1 (manufactured by Sumitomo Chemical Co., Ltd.), DPN-250, DPN-250BX, DPN-245, DPN-270BX, DPB-550BX and DPN-550RX (manufactured by Toda Kogyo Corp.), titanium oxide TTO-51B, TTO-55A, TTO-55B, TTO-55C, TTO-55S, TTO-55D, SN-100, MJ-7, α-iron oxide E270, E271 and E300 (manufactured by Ishihara Sangyo Kaisha Ltd.), STT-4D, STT-30D, STT-30 and STT-65C (manufactured by Titan Kogyo Kabushiki Kaisha), MT-100S, MT-100T, MT-150W, MT-500B, T-600B, T-100F and T-500HD (manufactured by TAYCA CORPORATION), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2P_{25}$ (manufactured by Nippon Aerosil Co., Ltd.), 100A and 500A (manufactured by Ube Industries, Ltd.), Y-LOP and calcined products of it (manufactured by Titan Kogyo Kabushiki Kaisha). Particularly preferred nonmagnetic powders are titanium dioxide and α-iron oxide.

A desired micro Vickers hardness can be obtained by adding carbon blacks to a nonmagnetic layer with nonmagnetic powder, and surface electrical resistance and light transmittance can be reduced as well. The micro Vickers hardness of a nonmagnetic layer is generally from 25 to 60 $kg/mm^2$ (from 245 to 588 MPa), preferably from 30 to 50 $kg/mm^2$ (from 294 to 940 MPa) for adjusting the head touch. Micro Vickers hardness can be measured using a triangular pyramid diamond needle having sharpness of 80° and a tip radius of 0.1 μm attached at the tip of an indenter using a membrane hardness meter HMA-400 (manufactured by NEC Corporation). Light transmittance is standardized that the absorption of infrared ray of the wavelength of about 900 nm is generally 3% or less, e.g., the light transmittance of a magnetic tape for VHS is 0.8% or less. For his purpose, furnace blacks for rubbers, thermal blacks for rubbers, carbon blacks for coloring, and acetylene blacks can be used.

Carbon blacks for use in a nonmagnetic layer in the invention have a specific surface area of generally from 100 to 500 $m^2/g$, preferably from 150 to 400 $m^2/g$, a DBP oil absorption amount of generally from 20 to 400 ml/100 g, preferably from 30 to 200 ml/100 g, a particle size of generally from 5 to 80 nm, preferably from 10 to 50 nm, and more preferably from 10 to 40 nm, pH of generally from 2 to 10, a moisture content of from 0.1 to 10%, and a tap density of preferably from 0.1 to 1 g/ml.

The specific examples of carbon blacks for use in a nonmagnetic layer of the invention include BLACK-PEARLS 2000, 1300, 1000, 900, 800, 880, 700, and VUL-CANXC-72 (manufactured by Cabot Co., Ltd.), #3050B, #3150B, #3250B, #3750B, #3950B, #950, #650B, #970B, #850 B and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.).

Carbon blacks for use in the present invention may previously be surface-treated with a dispersant, may be grafted with a resin, or a part of the surface may be graphitized before use. Carbon blacks may be previously dispersed in a binder before addition to a coating solution. Carbon blacks can be used within the range not exceeding 50 weight % based on the above inorganic powders and not exceeding 40 weight % based on the total weight of the nonmagnetic layer. These carbon blacks can be used alone or in combination. Regarding carbon blacks for use in a nonmagnetic layer in the present invention, for example, compiled by Carbon Black Association, *Carbon Black Binran* (*Handbook of Carbon Blacks*) can be referred to.

Organic powders can be used in a nonmagnetic layer according to purpose. The examples of such organic powders include acryl styrene resin powder, benzoguanamine resin powder, melamine resin powder and a phthalocyanine pigment. In addition, polyolefin resin powders, polyester resin powders, polyamide resin powders, polyimide resin powders and polyethylene fluoride resin powders can also be used. The producing methods of these organic powders are disclosed in JP-A-62-18564 and JP-A-60-255827.

Binder resins, lubricants, dispersants, additives, solvents, dispersing methods, etc., used for a magnetic layer can be used in a nonmagnetic layer. In particular, with respect to the amounts and the kinds of binder resins, and the amounts and the kinds of additives and dispersants, well-known prior arts regarding magnetic layers can be applied to a nonmagnetic layer.

Back Coat Layer

It is preferred that a back coat layer provided in the magnetic recording medium in the invention contains carbon black and inorganic powder.

Two kinds of carbon blacks respectively having different average particle sizes are preferably used in combination in a back coat layer. In such a case, it is preferred to use a fine carbon black having an average particle size of from 10 to 60 nm and a coarse carbon black having an average particle size of from 70 to 270 nm in combination.

In general, by the addition of a fine carbon black as above, the surface electrical resistance of a back coat layer and light transmittance can be set up at low values respectively. Since there are many kinds of magnetic recording apparatus making use of light transmittance of a tape to make it as a signal of operation, the addition of fine carbon blacks is particularly effective in such a case. In addition, fine carbon blacks are in general excellent in retention of a liquid lubricant and contribute to the reduction of a friction coefficient when lubricants are used in combination. On the other hand, coarse carbon blacks have a function as a solid lubricant and form minute spines on the surface of a back coat layer to thereby reduce the contact area and contribute to the reduction of a friction coefficient.

The specific examples of commercially available fine carbon blacks and coarse carbon blacks used in a back coat layer in the invention are disclosed in WO 98/35345.

When two kinds of carbon blacks respectively having different average particle sizes are used in combination in a back coat layer, the proportion of the contents (by weight) of a fine carbon black and a coarse carbon black is preferably the former/the latter of from 98/2 to 75/25, and more preferably from 95/5 to 85/15. The content of a carbon black in a back coat layer (the total amount when two kinds of carbon blacks are used) is generally from 30 to 80 weight parts (parts by weight) per 100 weight parts of the binder, and preferably from 45 to 65 weight parts.

It is preferred to use two kinds of inorganic powders each having different hardness in combination in a back coat layer. Specifically, soft inorganic powder having a Mohs' hardness of from 3 to 4.5 and hard inorganic powder having a Mohs' hardness of from 5 to 9 are preferably used. By using soft inorganic powder having a Mohs' hardness of from 3 to 4.5, a friction coefficient can be stabilized against repeating running. Moreover, a sliding guide pole is not scratched off due to the hardness in this range. The average particle size of the soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more. The content of the soft inorganic powders in a back coat layer is preferably from 10 to 140 weight parts based on 100 weight parts of the carbon black, and more preferably from 35 to 100 weight parts.

By the addition of hard inorganic powders having a Mohs' hardness of from 5 to 9, the strength of the back coat layer increases and running durability is improved. When such hard inorganic powders are used together with carbon blacks and the soft inorganic powders, deterioration due to repeating sliding is reduced and a strong back coat layer can be obtained. An appropriate abrasive property is provided to the back coat layer by the addition of the hard inorganic powder and the adhesion of scratched powders to a tape guide pole is reduced. In particular, when hard inorganic powder and soft inorganic powder are used in combination, the sliding characteristics against a guide pole having a rough surface is improved and the stabilization of a friction coefficient of the back coat layer can also be brought about. The average particle size of hard inorganic powders is preferably from 80 to 250 nm, and more preferably from 100 to 210 nm.

The examples of hard inorganic powders having a Mohs' hardness of from 5 to 9 include, e.g., α-iron oxide, α-alumina, and chromium oxide ($Cr_2O_3$). These powders may be used alone or in combination. Of the above hard inorganic powders, α-iron oxide and α-alumina are preferred. The content of hard inorganic powders in a back coat layer is generally from 3 to 30 weight parts per 100 weight parts of the carbon black, and preferably from 3 to 20 weight parts.

When soft inorganic powders and hard inorganic powders are used in combination in a back coat layer, it is preferred to use them selectively such that the difference of hardness between soft and hard inorganic powders is 2 or more, more preferably 2.5 or more, and particularly preferably 3 or more. It is preferred that the above two kinds of inorganic powders respectively having specific average particle sizes and different Mohs' hardness and the above two kinds of carbon blacks respectively having different average particle sizes be contained in a back coat layer.

Lubricants may be contained in a back coat layer. The lubricants can be arbitrarily selected from among those usable in a magnetic layer as described above. The content of a lubricant added to a back coat layer is generally from 1 to 5 weight parts per 100 weight parts of the binder.

Undercoat Layer

The nonmagnetic support in the invention may be provided with an undercoat layer between the nonmagnetic layer and the nonmagnetic support. By providing an undercoat layer, the adhesion between the nonmagnetic support and the nonmagnetic layer can be improved. As the undercoat layer, polyester resins soluble in an organic solvent are used.

The thickness of the undercoat layer can be, e.g., about 0.5 μm or less.

Layer Constitution

The thickness of a nonmagnetic support in the magnetic recording medium according to the invention is preferably from 2 to 80 μm. In the case of a magnetic recording tape for computer, the thickness of the support is preferably from 3.5 to 7.5 μm, more preferably from 3.0 to 7.0 μm. The thickness of an undercoat layer is preferably from 0.01 to 0.8 μm, more preferably from 0.02 to 0.6 μm. The thickness of a back coat layer is preferably from 0.1 to 1.0 μm, more preferably from 0.2 to 0.8 μm.

The thickness of a nonmagnetic layer and a magnetic layer of the magnetic recording medium of the invention is optimized according to the saturation magnetization amount of the head to be used, the head gap length, and the recording signal zone, and the thickness of a nonmagnetic layer is generally from 0.01 to 0.1 μm, preferably from 0.02 to 0.08 μm, and more preferably from 0.03 to 0.08 μm. The coefficient of fluctuation of a magnetic layer thickness is preferably not more than ±50%, and more preferably not more than ±40%. A magnetic layer comprises at least one layer, or may be separated to two or more layers each having different magnetic characteristics, and well known constitutions of multilayer magnetic layers can be used in the invention.

The thickness of a nonmagnetic layer in the invention is generally from 0.2 to 5.0 μm, preferably from 0.3 to 3.0 μm, and more preferably from 1.0 to 2.5 μm.

Manufacturing Method of Magnetic Recording Medium

The manufacturing process of a magnetic layer coating solution of the magnetic recording medium in the invention comprises at least a kneading step, a dispersing step and optionally a blending step to be carried out before and/or after the kneading and dispersing steps. Each of these steps may be composed of two or more separate stages. All of the feedstock such as ferromagnetic metal powder, nonmagnetic powder, a binder, a carbon black, an abrasive, an antistatic agent, a lubricant and a solvent for use in the invention may be added at any step at any time. Each feedstock may be added at two or more steps dividedly. For example, polyurethane can be added dividedly at a kneading step, a dispersing step, or a blending step for adjusting viscosity after dispersion. For achieving the object of the invention, conventionally well known techniques can be performed partly with the above steps. Powerful kneading machines such as an open kneader, a continuous kneader, a pressure kneader or an extruder are preferably used in a kneading step. When a kneader is used, all or a part of the binder (preferably 30% or more of the total binders) is kneaded in the range of from 15 parts to 500 parts per 100 parts of the magnetic powder together with the magnetic powder or nonmagnetic powder. These kneading treatments are disclosed in detail in JP-A-1-106338 and JP-A-1-79274. For dispersing a magnetic layer coating solution and a nonmagnetic layer coating solution, glass beads can be used, but dispersing media having a high specific gravity, e.g., zirconia beads, titania beads and steel beads are preferred for this purpose. The optimal particle size and the packing rate of these dispersing media have to be selected. Well-known dispersers can be used in the invention.

In the manufacturing method of the magnetic recording medium in the invention, a magnetic layer is formed by coating a magnetic layer coating solution in a prescribed thickness on the surface of a nonmagnetic support under running. A plurality of magnetic layer coating solutions may be multilayer-coated successively or simultaneously, or a nonmagnetic layer coating solution and a magnetic layer coating solution may be multilayer-coated successively or simultaneously. Air doctor coating, blade coating, rod coating, extrusion coating, air knife coating, squeeze coating, impregnation coating, reverse roll coating, transfer roll coating, gravure coating, kiss coating, cast coating, spray coating and spin coating can be used for coating the above magnetic layer coating solution or nonmagnetic layer coating solution. Coating methods described, e.g., in *Saishin Coating Gijutsu* (*The Latest Coating Techniques*), Sogo Gijutsu Center Co. (May 31, 1983) can be referred to.

In the case of a magnetic tape, the ferromagnetic metal powder contained in a coated layer of a magnetic layer coating solution is subjected to orientation in the machine direction with a cobalt magnet and a solenoid. In the case of a magnetic disc, isotropic orienting property can be sufficiently obtained in some cases without performing orientation with orientating apparatus, but it is preferred to use well-known random orientation apparatus, e.g., disposing cobalt magnets diagonally and alternately or applying an alternating current magnetic field with a solenoid. In the case of ferromagnetic metal powder, isotropic orientation of generally in-plane two dimensional random orientation is preferred, but it is possible to make three dimensional random orientation by applying perpendicular factor. Hexagonal ferrite magnetic powders have generally an inclination for three-dimensional random orientation of in-plane and in the perpendicular direction, but it is also possible to make in-plane two-dimensional random orientation. It is also possible to give isotropic magnetic characteristics in the circumferential direction by perpendicular orientation using well-known methods, e.g., using different pole and counter position magnets. In particular, perpendicular orientation is preferred when the disc is used in high density recording. Circumferential orientation can be performed using spin coating.

In orientation, it is preferred that the drying position of a coated film be controlled by controlling the temperature and the amount of drying air and coating rate. Coating rate is preferably from 20 to 1,000 m/min and the temperature of drying air is preferably 60° C. or higher. Preliminary drying can be performed appropriately before entering a magnet zone.

After drying, the coated layer is generally subjected to surface smoothing treatment with, e.g., a super calender roll and the like. The voids generated by the removal of the solvent in drying disappear by the surface smoothing treatment and the packing rate of the ferromagnetic metal powder in the magnetic layer increases, so that a magnetic recording medium having high electromagnetic characteristics can be obtained. Heat resisting plastic rolls, e.g., epoxy, polyimide, polyamide and polyimideamide are used as the calendering treatment rolls. Metal rolls can also be used in calendering treatment.

It is preferred for the magnetic recording medium in the invention to have extremely excellent surface smoothness as high as from 0.1 to 4 nm of central plane average surface roughness at a cut-off value of 0.25 mm, more preferably from 1 to 3 nm. Such high smoothness can be obtained by forming a magnetic layer by using the specific ferromagnetic metal powder and binder as described above, and subjecting the magnetic layer to calendering treatment. As the conditions of calendering treatment, the temperature of calender rolls is from 60 to 100° C., preferably from 70 to 100° C., and particularly preferably from 80 to 100° C., the pressure is from 100 to 500 kg/cm (from 98 to 490 kN/m), preferably from 200 to 450 kg/cm (from 196 to 441 kN/m), and particularly preferably from 300 to 400 kg/cm (from 294 to 392 kN/m).

For reducing a heat shrinkage factor, there are a method of performing heat treatment of a magnetic recording medium in a web state while handling under low tension, and a method of performing heat treatment of a tape as a pile, e.g., in a bulk state or a state of being encased in a cassette (a thermo treatment method), and both methods can be used. From the point of providing a magnetic recording medium of high output and low noise, a thermo treatment method is preferred.

A magnetic recording medium obtained is cut in a desired size with a cutter. The cutter is not particularly restricted, but those having a plurality of pairs of rotating upper blade (a male blade) and lower blade (a female blade) are preferred, so that a slitting rate, the depth of intermeshing, peripheral ratio of upper blade (a male blade) and lower blade (a female blade) (peripheral speed of upper blade/peripheral speed of lower blade), and the continuous working time of slitting blades can be arbitrarily selected.

Physical Characteristics

The saturation magnetic flux density of a magnetic layer of a magnetic recording medium for use in the invention is preferably from 100 to 300 mT. The coercive force (Hr) of a magnetic layer is preferably from 143.3 to 318.4 kA/m (from 1,800 to 4,000 Oe), more preferably from 159.2 to 278.6 kA/m (from 2,000 to 3,500 Oe). The coercive force distribution is preferably narrow, and SFD and SFDr is preferably 0.6 or less, more preferably 0.2 or less.

A magnetic recording medium for use in the invention has a friction coefficient against a head at temperature of −10° C. to 40° C. and humidity of 0% to 95% of 0.5 or less, preferably 0.3 or less, surface intrinsic viscosity of a magnetic surface of preferably from $10^4$ to $10^{12}$ Ω/sq, and a charge potential of preferably from −500 V to +500 V. The elastic modulus at 0.5% elongation of a magnetic layer is preferably from 0.98 to 19.6 GPa (from 100 to 2,000 kg/mm$^2$) in every direction of in-plane, breaking strength is preferably from 98 to 686 MPa (from 10 to 70 kg/mm$^2$), the elastic modulus of a magnetic recording medium is preferably from 0.98 to 14.7 GPa (from 100 to 1,500 kg/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less.

The glass transition temperature of a magnetic layer (the maximum point of the loss elastic modulus by dynamic viscoelasticity measurement at 110 Hz) is preferably from 50 to 180° C., and that of a nonmagnetic layer is preferably from 0 to 180° C. The loss elastic modulus is preferably in the range of from $1\times10^7$ to $8\times10^8$ Pa ($1\times10^8$ to $8\times10^9$ dyne/cm$^2$), and loss tangent is preferably 0.2 or less. When loss tangent is too large, adhesion failure is liable to occur. These thermal and mechanical characteristics are preferably almost equal in every direction of in-plane of the medium with the difference of not greater than 10%.

The residual amount of a solvent contained in a magnetic layer is preferably 100 mg/m$^2$ or less, more preferably 10 mg/m$^2$ or less. The void ratio of a coated layer is preferably 30% by volume or less, more preferably 20% by volume or less, with both of a nonmagnetic layer and a magnetic layer. The void ratio is preferably smaller for obtaining high output but in some cases a specific value should be preferably secured depending upon purposes. For example, in a disc medium that is repeatedly used, a large void ratio contributes to good running durability in many cases.

A magnetic layer preferably has a maximum height (SR$_{max}$) of 0.5 μm or less, a ten point average roughness (SRz) of 0.3 μm or less, a central plane peak height (SRp) of 0.3 μm or less, a central plane valley depth (SRv) of 0.3 μm or less, a central plane area factor (SSr) of from 20 to 80%, and an average wavelength (Sλa) of from 5 to 300 μm. These can be easily controlled by the control of the surface property of a polymer support with fillers or by the surface configurations of the rolls of calender treatment. Curling is preferably within ±3 mm.

When a magnetic recording medium of the invention comprises a nonmagnetic layer and a magnetic layer, these physical characteristics can be varied according to purposes in a nonmagnetic layer and a magnetic layer. For example, running durability can be improved by making the elastic modulus of the magnetic layer higher and at the same time the head touching of the magnetic recording medium can be improved by making the elastic modulus of the nonmagnetic layer lower than that of the magnetic layer.

EXAMPLES

The invention will be described more specifically with referring to examples. The components, ratios, operations and orders described herein can be changed without departing from the spirit and scope of the invention, and these are not limited to the following examples. In the examples "parts" means "weight parts" unless otherwise indicated.

Example 1

(1) Preparation of Magnetic Layer Coating Solution

| | |
|---|---|
| Ferromagnetic acicular metal powder | 100 parts |
| Composition: Fe/Co/Al/Y = 67/20/8/5 | |
| Surface treating compounds: $Al_2O_3$ and $Y_2O_3$ | |
| Coercive force (Hc): 183 kA/m | |
| Crystallite size: 12.5 nm | |
| Long axis length: 45 nm | |
| Acicular ratio: 6 | |
| Specific surface area ($S_{BET}$): 45 m$^2$/g | |
| Saturation magnetization ($\sigma_s$): 140 A·m$^2$/kg (140 emu/g) | |
| Polyurethane resin | 12 parts |
| (branched side chain-containing polyester polyol/diphenylmethane diisocyanate, containing a hydrophilic polar group: —$SO_3Na$ = 70 eq/ton) | |
| $\alpha$-$Al_2O_3$ (particle size: 0.06 μm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

(2) Preparation of Nonmagnetic Layer Coating Solution

| | |
|---|---|
| Nonmagnetic inorganic powder | 85 parts |
| $\alpha$-Iron oxide | |
| Surface treating compounds: $Al_2O_3$ and $SiO_2$ | |
| Long axis length: 0.15 μm | |
| Tap density: 0.8 g/ml | |
| Acicular ratio: 7 | |
| Specific surface area ($S_{BET}$): 52 m$^2$/g | |
| pH: 8 | |
| DBP oil absorption amount: 33 g/100 g | |
| Carbon black | 20 parts |
| DBP oil absorption amount: 120 ml/100 g | |
| pH: 8 | |
| Specific surface area ($S_{BET}$): 250 m$^2$/g | |
| Volatile content: 1.5% | |
| Polyurethane resin | 12 parts |
| (branched side chain-containing polyester polyol/diphenylmethane diisocyanate, containing a hydrophilic polar group: —$SO_3Na$ = 70 eq/ton) | |
| Acrylic resin | 6 parts |
| (benzyl methacrylate/diacetone acrylamide, containing a hydrophilic polar group, —$SO_3Na$ = 60 eq/ton) | |

With each of the magnetic layer coating solution and the nonmagnetic coating solution, components were kneaded in an open kneader for 60 minutes, and then dispersed in a sand mill for 120 minutes. Six parts of trifunctional low molecular weight polyisocyanate compound (Coronate 3041, manufactured by Nippon Polyurethane Co., Ltd.) was added to each resulting dispersion solution, each solution was further blended by stirring for 20 minutes, and then filtered through a filter having an average pore diameter of 1 μm, whereby a magnetic coating solution and a nonmagnetic coating solution were obtained.

(3) Preparation of Back Coat Layer Coating Solution

After kneading substance (i) having the following composition was preliminarily kneaded in a roll mill, kneading substance (ii) having the following composition was added thereto and dispersed with a sand grinder, and 5 parts of polyester resin and 5 parts of polyisocyanate were added to the completed dispersion to prepare a back coat layer coating solution.

Composition of Kneading Substance (i):

| | |
|---|---|
| Carbon black A (particle size: 40 nm) | 100 parts |
| Nitrocellulose (RS 1/2, manufactured by Asahi Kasei Corporation) | 50 parts |
| Polyurethane resin (glass transition temperature: 50° C.) | 40 parts |
| Dispersants | |
| Copper oleate | 5 parts |
| Copper phthalocyanine | 5 parts |
| Precipitating barium sulfate | 5 parts |
| Methyl ethyl ketone | 500 parts |
| Toluene | 500 parts |

Composition of Kneading Substance (ii):

| | |
|---|---|
| Carbon black B (particle size: 100 nm) | 100 parts |
| Nitrocellulose (RS 1/2, manufactured by Asahi Kasei Corporation) | 40 parts |
| Polyurethane resin | 10 parts |
| Methyl ethyl ketone | 300 parts |
| Toluene | 300 parts |

The above (i) and (ii) were dispersed with a sand grinder, and after dispersion, the following were added.

(4) Manufacture of Magnetic Tape:

The nonmagnetic coating solution was coated in a dry thickness of 1.5 μm on side A of a polyethylene 2,6-naphthalate support having a thickness of 7 μm having been previously subjected to corona discharge treatment, and immediately after that the magnetic coating solution was coated in a dry thickness of 0.1 μm by simultaneous multilayer-coating. The support comprises two layers having a tracer system three dimensional average surface roughness on the side having the magnetic layer (side A) of 4 nm, and that on the side having the back coat layer (side B) of 8 nm, and an intrinsic viscosity of 0.50 dl/g. The sample was subjected to magnetic field orientation with a magnet having a magnetic force of 300 T·m (3,000 Gauss) while the magnetic layer and the nonmagnetic layer were still wet, and drying. Subsequently, the back coat layer coating solution was coated on side B of the support in a dry thickness of 0.5 μm. After drying, the sample was subjected to surface smoothing treatment with a calender of seven stages comprising metal rolls alone at a linear pressure of 300 kg/cm at 90° C., and further to heat treatment at 70° C. for 48 hours. The obtained web was slit to a width of ½ inch, whereby a magnetic tape was obtained.

Examples 2 to 8

Samples in Examples 2 to 8 were manufactured in the same manner as in Example 1 except for changing the surface roughness of each nonmagnetic support, magnetic layer and back coat layer as shown in Table 1 below.

Comparative Examples 1 to 4

Samples in Comparative Examples 1 to 4 were manufactured in the same manner as in Example 1 except for changing the surface roughness of each nonmagnetic support, magnetic layer and back coat layer as shown in Table 1 below.

In Examples 2 to 8 and Comparative Examples 1 to 4, the surface roughness of each magnetic layer was adjusted by changing the tracer system three-dimensional average surface roughness on the side having the magnetic layer (side A) of the nonmagnetic support. The surface roughness of the back coat layer was adjusted by mainly changing the particle size of carbon black B in the back coat layer coating solution in the range of from 70 to 270 nm.

The physical characteristics of the nonmagnetic support and the surface roughness of the magnetic layer and the back coat layer of each sample were measured according to the following measuring methods.

(1) Measurement of Intrinsic Viscosity

Each polyester film was dissolved in a mixed solvent of phenol/1,1,2,2-tetrachloroethane (60/40 by weight), and intrinsic viscosity was measured at 25° C. with an automatic viscometer mounting Ubbelohde's viscometer.

(2) Measurement of Number Average Molecular Weight

The number average molecular weight was found from the analytical curve formed by dissolving a polyester film in hexafluoroisopropanol (HFIP), with GPC HLC-8220 (constitution of column: comprising two Super HM-M, the temperature of the column bath: 40° C., manufactured by TOSOH CORPORATION), also using HFIP as the eluate, and polymethyl methacrylate (PMMA) whose molecular weight is already known.

(3) Measurement of Surface Roughness (SRa) with a Tracer System Three-Dimensional Surface Roughness Meter SRa was measured with a tracer system roughness meter (manufactured by Kosaka Laboratory Ltd.) according to JIS B 0601.

(4) Measurement of Surface Roughness (Ra) of Magnetic Layer and Back Coat Layer

Ra was measured with an atomic force microscope (AFM) Nanoscope III (manufactured by Digital Instruments Corp.).

The performances of the obtained magnetic tape were evaluated as follows. The results obtained are shown in Table 1 below.

(1) SNR: Error Rate

The recorded signals of each magnetic tape were reproduced by 8-10 conversion RP1 equalization system at 25° C. 50% RH and the error rate was measured. The obtained results are shown with magnetic tape 1 as 0 dB.

(2) Rolling Up Property

Each magnetic tape was built-in in a cartridge, and prescribed signals were recorded with LTO-Gen. 1 drive, and the cartridge was disassembled after running one round at 23° C. 50% RH. The rolling up state was visually observed from the transparent flange side of the reel and evaluated according to the following criteria.

◎: Free from disorder of rolling.
○: Disorder of rolling was observed at one point.
Δ: Disorders of rolling were observed at 2 to 5 points.
X: Disorders of rolling were observed at 6 points or more.

(3) Durability (Dirtying from the Edge of a Tape)

After the prescribed signals were recorded with LTO-Gen. 1 drive and each tape was run 10,000 rounds at 23° C. 50% RH, the state of dirtying on the drive guide where the tape edge was kept in contact was observed and evaluated according to the following criteria. The dirtying results from the generation of scratching of a tape edge due to low durability of the edge.

◎: Dirtying from the edge of the tape was not observed at all.
○: Dirtying from the edge of the tape was generated in the area ratio of less than ⅛.
Δ: Dirtying from the edge of the tape was generated in the area ratio of from ⅛ to ¼.
X: Dirtying from the edge of the tape was generated in the area ratio of ¼ or more.

TABLE 1

| Ex. No. | Material of Nonmagnetic Support | Number Average Molecular Weight | Intrinsic Viscosity (dl/g) | SRa (A) (nm) | SRa (B) (nm) | Ra of Magnetic Layer (nm) | Ra of Back Coat Layer (nm) | SNR (dB) | Rolling Up Property | Durability |
|---|---|---|---|---|---|---|---|---|---|---|
| Ex. 1 | Polyethylene-2,6-naphthalate | 16,000 | 0.50 | 4 | 9 | 3 | 11 | 0 | ◎ | ◎ |
| Ex. 2 | Polyethylene-2,6-naphthalate | 12,000 | 0.41 | 4 | 9 | 3 | 11 | 0.1 | ◎ | ○ |
| Ex. 3 | Polyethylene-2,6-naphthalate | 24,000 | 0.58 | 4 | 9 | 3 | 11 | 0.3 | ◎ | ○ |
| Ex. 4 | Polyethylene-2,6-naphthalate | 16,000 | 0.50 | 1.5 | 8 | 1.5 | 10.5 | 1.5 | ○ | ◎ |
| Ex. 5 | Polyethylene-2,6-naphthalate | 16,000 | 0.50 | 6 | 9 | 5 | 11 | −0.6 | ◎ | ◎ |
| Ex. 6 | Polyethylene-2,6-naphthalate | 16,000 | 0.50 | 4 | 6 | 3 | 7 | 0.4 | ○ | ◎ |
| Ex. 7 | Polyethylene-2,6-naphthalate | 16,000 | 0.50 | 4 | 10 | 3 | 12 | −0.5 | ◎ | ◎ |
| Ex. 8 | Polyethylene terephthalate | 14,000 | 0.50 | 4 | 8 | 3 | 10.5 | 0.1 | ◎ | Δ |
| Comp. Ex. 1 | Polyethylene-2,6-naphthalate | 8,000 | 0.38 | 4 | 9 | 3 | 11 | 0.1 | ◎ | X |
| Comp. Ex. 2 | Polyethylene-2,6-naphthalate | 26,000 | 0.62 | 4 | 9 | 3 | 11 | 0 | ◎ | X |
| Comp. Ex. 3 | Polyethylene-2,6-naphthalate | 16,000 | 0.50 | 7 | 8 | 6.5 | 10.5 | −2.5 | ◎ | ◎ |
| Comp. Ex. 4 | Polyethylene-2,6-naphthalate | 16,000 | 0.50 | 4 | 4 | 3 | 5 | 0.1 | X | ◎ |

As is shown in Table 1, the medium in Comparative Example 1 is small in the intrinsic viscosity and number average molecular weight of the polyester for use in the nonmagnetic support, so that the sample is weak in strength and inferior in durability. The medium in Comparative Example 2 is large in the intrinsic viscosity and number average molecular weight of the polyester for use in the nonmagnetic support and the medium is high in strength but lacks flexibility and becomes brittle, so that the sample is inferior in durability. In the medium in Comparative Example 3, the surface of the magnetic layer is too rough, so that the medium is low in SNR. In the medium in Comparative Example 4, the back coat layer surface is too smooth, so that the medium is inferior in a rolling up property.

On the other hand, the magnetic recording media in the invention maintain high SNR, show good rolling up property, and are little in the damage of a tape edge, and high in durability, so that great effects can be observed in the method of the invention as compared with conventional techniques.

This application is based on Japanese Patent application JP 2004-24032, filed Jan. 30, 2004, the entire content of which is hereby incorporated by reference, the same as if set forth at length.

What is claimed is:

1. A magnetic recording medium comprising: a magnetic layer containing ferromagnetic powder and a binder; a nonmagnetic support; and a back coat layer, in this order, wherein the nonmagnetic support contains polyester having an intrinsic viscosity of from 0.48 to 0.52 dl/g and a number average molecular weight of from 12,000 to 24,000, a surface of the magnetic layer on a side not having the nonmagnetic support has a surface roughness Ra of from 1 to 5 nm, and a surface of the back coat layer on a side not having the nonmagnetic support has a surface roughness Ra of from 6 to 20 nm.

2. The magnetic recording medium according to claim 1, wherein the nonmagnetic support comprises two layers each independently containing polyester, a tracer system three dimensional surface roughness of the nonmagnetic support surface on a side having the magnetic layer, SRa(A) is from 1 to 6 nm, a tracer system three dimensional surface roughness on a side having the back coat layer, SRa(B) is from 6 to 10 nm, and SRa (A) <SRa (B).

3. The magnetic recording medium according to claim 1, further comprising a nonmagnetic layer containing nonmagnetic powder and a binder, so that the nonmagnetic support, the nonmagnetic layer and the magnetic layer are in this order.

4. The magnetic recording medium according to claim 1, wherein the polyester has a number average molecular weight of from 14,000 to 18,000.

5. The magnetic recording medium according to claim 1, wherein the polyester has a number average molecular weight of from 16,000 to 17,000.

6. The magnetic recording medium according to claim 1, wherein the surface of the magnetic layer on a side not having the nonmagnetic support has a surface roughness Ra of from 2 to 5 nm.

7. The magnetic recording medium according to claim 1, wherein the surface of the back coat layer on a side not having the nonmagnetic support has a surface roughness Ra of from 8 to 15 nm.

8. The magnetic recording medium according to claim 1, wherein the surface of the back coat layer on a side not having the nonmagnetic support has a surface roughness Ra of from 9 to 13 nm.

9. The magnetic recording medium according to claim 2, wherein the nonmagnetic support comprises a first layer and a second layer so that the magnetic layer, the first layer, the second layer and the back coat layer are in this order, the second layer having a thickness of from ½ to 1/10 of a thickness of the nonmagnetic support.

10. The magnetic recording medium according to claim 9, wherein the first layer contains 0.1 weight % or less of particles having an average particle size of from 30 to 150 nm.

11. The magnetic recording medium according to claim 9, wherein the first layer contains 0.06 weight % or less of particles having an average particle size of from 30 to 150 nm.

12. The magnetic recording medium according to claim 9, wherein the first layer contains 0.1 weight % or less of particles having an average particle size of from 40 to 100 nm.

13. The magnetic recording medium according to claim 9, wherein the first layer contains 0.06 weight % or less of particles having an average particle size of from 40 to 100 nm.

14. The magnetic recording medium according to claim 10, wherein the particles are at least one of silica, calcium carbonate, alumina, polyacrylic particles and polystyrene particles.

15. The magnetic recording medium according to claim 9, wherein the second layer contains from 0.05 to 1.0 weight % of particles having an average particle size of from 80 to 800 nm.

16. The magnetic recording medium according to claim 9, wherein the second layer contains from 0.08 to 0.8 weight % of particles having an average particle size of from 80 to 800 nm.

17. The magnetic recording medium according to claim 9, wherein the second layer contains from 0.05 to 1.0 weight % of particles having an average particle size of from 100 to 700 nm.

18. The magnetic recording medium according to claim 9, wherein the second layer contains from 0.08 to 0.8 weight % of particles having an average particle size of from 100 to 700 nm.

* * * * *